(12) United States Patent
Khan et al.

(10) Patent No.: US 11,693,541 B2
(45) Date of Patent: Jul. 4, 2023

(54) APPLICATION LIBRARY AND PAGE HIDING

(71) Applicant: Apple Inc., Cupertino, CA (US)

(72) Inventors: Nahir A. Khan, San Francisco, CA (US); John L. Blatz, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/353,680

(22) Filed: Jun. 21, 2021

(65) Prior Publication Data

US 2021/0397314 A1  Dec. 23, 2021

Related U.S. Application Data

(60) Provisional application No. 63/042,000, filed on Jun. 21, 2020.

(51) Int. Cl.
*G06F 3/0484* (2022.01)
*G06F 9/451* (2018.01)
*G06F 11/34* (2006.01)
*G06F 3/0482* (2013.01)

(52) U.S. Cl.
CPC ............ *G06F 3/0484* (2013.01); *G06F 9/451* (2018.02); *G06F 11/3495* (2013.01); *G06F 3/0482* (2013.01)

(58) Field of Classification Search
None
See application file for complete search history.

(56) References Cited

U.S. PATENT DOCUMENTS

| 2012/0291022 A1* | 11/2012 | Mehta | G06F 8/60 717/176 |
| 2013/0219319 A1 | 8/2013 | Park et al. | |
| 2014/0101583 A1* | 4/2014 | Jeong | G06F 9/451 715/765 |
| 2014/0149920 A1* | 5/2014 | Wang | G06F 3/0487 715/783 |

(Continued)

FOREIGN PATENT DOCUMENTS

WO    WO 2016/099708    6/2016

OTHER PUBLICATIONS

International Search Report and Written Opinion from PCT/US2021/038256, dated Oct. 8, 2021, 14 pages.

*Primary Examiner* — Ryan Barrett
(74) *Attorney, Agent, or Firm* — BakerHostetler

(57) ABSTRACT

A device implementing a system to provide an application library for application discovery includes a processor configured to update an application library including ordered lists of installed applications grouped into a respective plurality of application categories. The updating may be based on an application usage history of a device. The processor is further configured to receive a first user input to open an application library user interface corresponding to the application library. The processor is further configured to display, in response to the first user input, a plurality of application launch interfaces, each of the plurality of application launch interfaces corresponding to a respective one of the ordered lists of installed applications grouped into the respective plurality of application categories within the application library user interface.

21 Claims, 13 Drawing Sheets

(56) References Cited

U.S. PATENT DOCUMENTS

| | | | | |
|---|---|---|---|---|
| 2015/0089438 A1* | 3/2015 | Wu | ............... | G06F 3/04842 |
| | | | | 715/776 |
| 2016/0179454 A1* | 6/2016 | Liu | ............... | G06F 3/04886 |
| | | | | 715/747 |
| 2016/0246478 A1* | 8/2016 | Davis | ............... | G06F 3/04817 |
| 2016/0360382 A1* | 12/2016 | Gross | ............... | G06F 9/453 |
| 2017/0083711 A1* | 3/2017 | Hemaraj | ............... | G06F 3/0488 |
| 2017/0336913 A1* | 11/2017 | Yoo | ............... | G06F 1/1647 |
| 2020/0037019 A1* | 1/2020 | Liusaari | ............... | G06F 3/04842 |

* cited by examiner

HIERARCHY 410A
1 Leaf Node

———————————————————————————————

HIERARCHY 410B
2 Leaf Nodes

———————————————————————————————

HIERARCHY 410C
3 Leaf Nodes

APPLICATION LIBRARY AND PAGE HIDING

CROSS REFERENCE TO RELATED APPLICATIONS

This application claims the benefit of priority to U.S. Provisional Patent Application No. 63/042,000, entitled "Application Library And Page Hiding," filed on Jun. 21, 2020, the disclosure of which is hereby incorporated herein in its entirety.

TECHNICAL FIELD

The present description relates generally to electronic devices, including methods and systems for providing an application library for application discovery and page hiding for home screen management.

BACKGROUND

Applications may provide information and experiences that are of interest to a user. However, applications may be minimally organized, making it difficult for users to discover installed applications that may be relevant to user interests. For example, applications may be installed to successive home screens by most recent installation date, which may not be a useful organization metric for the user. As a result, users may spend unnecessary time navigating through several home screens to find an application to launch.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

As discussed above, existing methods of organizing home screens may make application discovery difficult for users. To provide improved application discovery, user interfaces for browsing and/or searching an application library are provided, where applications are organized into categories based at least on application usage history. By browsing the application library, applications that may be of interest to the user may be more easily discovered and launched compared to a manual navigation through several pages of home screens. To further streamline navigation of home screens, a hide functionality may be provided to hide or unhide particular home screens. In one or more implementations, the applications linked from hidden home screens can still be accessible through the application library.

Figure 1:
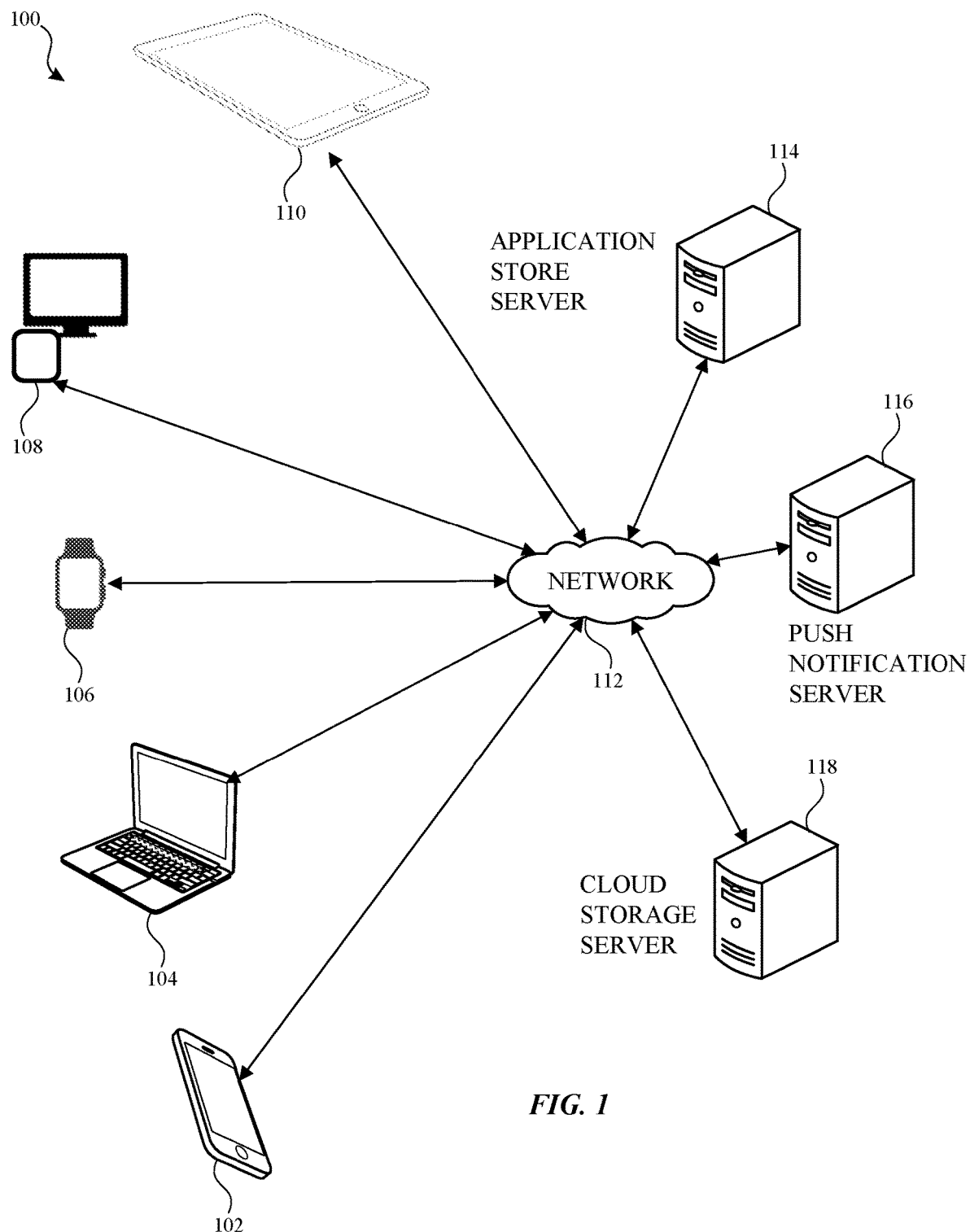
FIG. 1 illustrates an example network environment in which a system for providing an application library for application discovery and page hiding for home screen management may be implemented, in accordance with one or more implementations.

FIG. 1 illustrates an example network environment in which a system for providing an application library for application discovery and page hiding for home screen management may be implemented, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 104, 106, 108 and 110 (hereinafter "the electronic devices 102-110"), an application store server 114, a push notification server 116 and a cloud storage server 118 (hereinafter "the servers 114-118"), and a network 112. The network 112 may communicatively (directly or indirectly) couple, for example, any two or more of the electronic devices 102-110 and the servers 114-118. In one or more implementations, the network 112 may be an interconnected network of devices that may include, and/or may be communicatively coupled to, the Internet. In one or more implementations, the network 112 may correspond to a local area network (e.g., a WiFi network) connecting one or more of the electronic devices 102-110. For explanatory purposes, the network environment 100 is illustrated in FIG. 1 as including electronic devices 102-110 and servers 114-118; however, the network environment 100 may include any number of electronic devices and any number of servers.

One or more of the electronic devices 102-110 may be, for example, a portable computing device such as a laptop computer, a smartphone, a smart speaker, a digital media player, a peripheral device (e.g., a digital camera, headphones), a tablet device, a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone, the electronic device 104 is depicted as a laptop computer, the electronic device 106 is depicted as a smartwatch, and the electronic device 110 is depicted as a tablet. By way of example, the electronic device 108 is depicted as a digital media player (e.g., configured to receive digital data such as music and/or video and stream it to a television or other video display). In one or more implementations, the electronic device 108 may be integrated into the display device.

One or more of the electronic devices 102-110 may be configured to communicate or otherwise interact with one or more of the servers 114-118. Each of the electronic devices 102-110 may be, and/or may include all or part of, the device discussed below with respect to FIG. 2, and/or the electronic system discussed below with respect to FIG. 8.

In one or more implementations, the application store server 114 may be configured to provide applications for storage and execution on electronic devices 102-110. The electronic devices 102-110 may periodically query the application store server 114 for updated applications. Updates from application store server 114 may also be pushed to electronic devices 102-110. The push notification server 116 may be configured to receive push notifications for third party applications, which may be pushed to electronic devices 102-110 when compliant with an update policy, as described further in FIG. 3. The cloud storage server 118 may be configured to store data (e.g., files such as documents and/or photos) associated with user accounts for download on user devices, to share and/or send data to other users, and/or to back-up (e.g., wirelessly) device data.

One or more of the servers 114-118 may be, and/or may include all or part of the electronic system discussed below with respect to FIG. 8. Each of the servers 114-118 may include one or more servers, such as a cloud of servers. For explanatory purposes, a single server is shown and discussed with respect to various operations for each of the servers 114-118. However, these and other operations discussed herein may be performed by one or more servers, and each different operation may be performed by the same or different servers.

Figure 2:
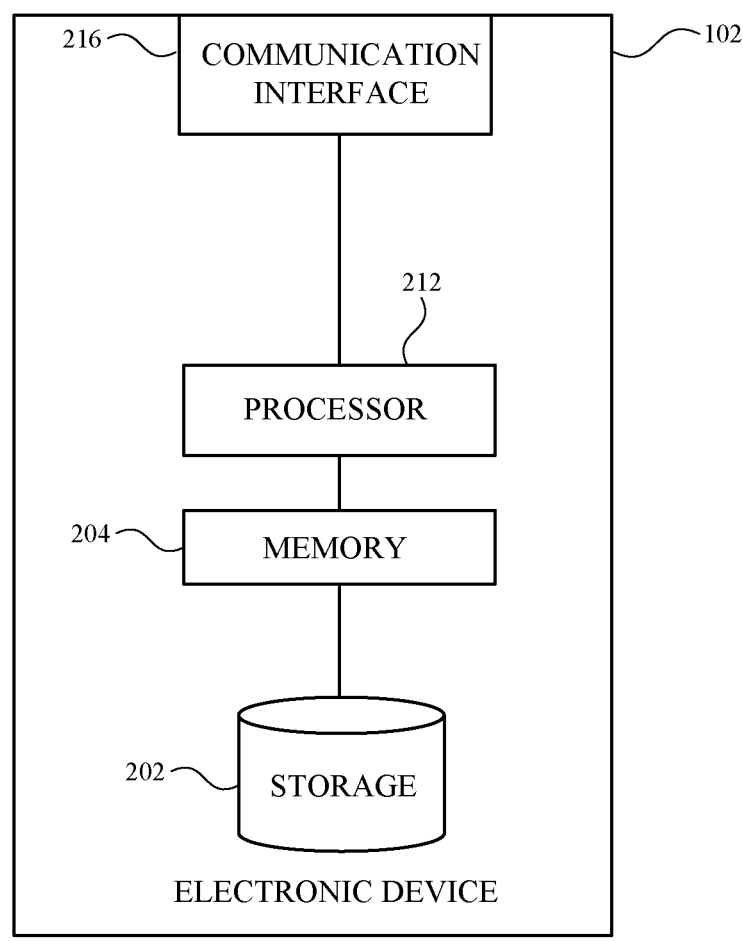
FIG. 2 illustrates a block diagram of an example electronic device that may implement an application library for application discovery and page hiding for home screen management, in accordance with one or more implementations.

FIG. 2 illustrates a block diagram of an example electronic device that may implement an application library for application discovery and page hiding for home screen management, in accordance with one or more implementations. For explanatory purposes, FIG. 2 is primarily described herein with reference to the electronic device 102 of FIG. 1. However, FIG. 2 may correspond to any of the electronic devices 102-110 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a storage 202, a memory 204, a processor 212, and a communication interface 216. The storage 202 may correspond to a first type of memory, such as a non-volatile memory, including flash storage such as NAND flash and/or magnetic storage. The memory 204 may correspond to a second type of memory, such as a volatile memory, including dynamic random-access memory (DRAM). The memory 204 may include suitable logic, circuitry, and/or code that enable storage of various types of information such as received data, generated data, code, and/or configuration information.

The processor 212 may include suitable logic, circuitry, and/or code that enable processing data and/or controlling operations of the electronic device 102. In this regard, the processor 212 may be enabled to provide control signals to various other components of the electronic device 102. The processor 212 may also control transfers of data between various portions of the electronic device 102, including storage 202 and memory 204. Additionally, the processor 212 may enable implementation of an operating system or otherwise execute code to manage operations of the electronic device 102. The processor 212 may include general purpose processors, graphics processing units (GPUs), and/or specialized processors.

In one or more implementations, the memory 204 may store one or more background processes for providing application library user interfaces and hiding of home screens. As described below with respect to FIG. 3, the background processes may also maintain application usage history, application classification metadata, and update application library categories.

The communication interface 216 may include suitable logic, circuitry, and/or code that enables wired or wireless communication, such as between any of the electronic devices 102-110 and one of more of the servers 114-118 over the network 112. The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 212, the storage 202, the memory 204, the communication interface 216, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
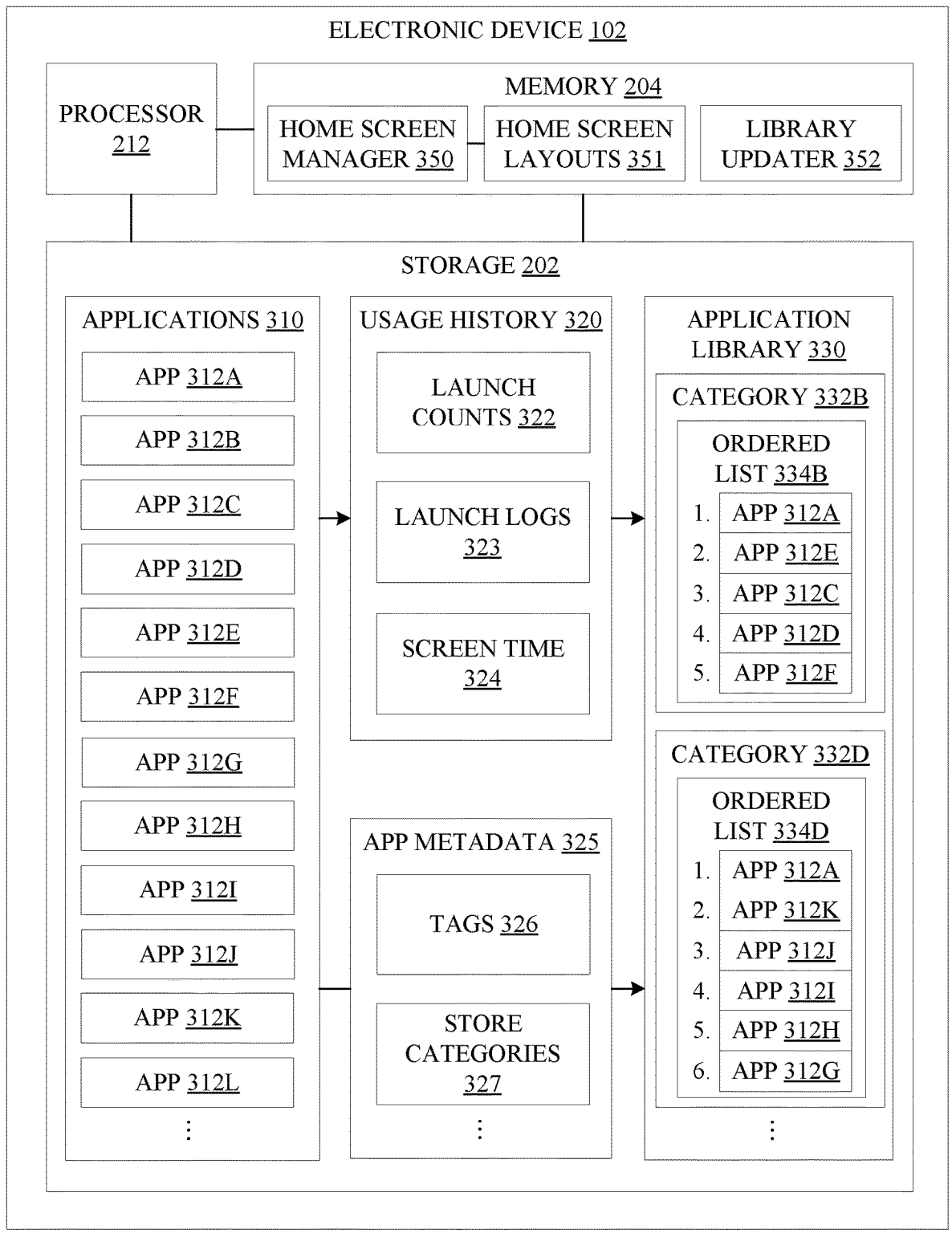
FIG. 3 illustrates a block diagram of an example electronic device for executing background processes and storing applications, application usage history, and an application library, in accordance with one or more implementations.

FIG. 3 illustrates a block diagram of an electronic device 102 for executing background processes and storing applications 310, usage history 320, and application library 330, in accordance with one or more implementations. As shown in FIG. 3, electronic device 102 may include storage 202, memory 204, and processor 212. Storage 202 may include applications 310, usage history 320, application metadata 325, and application library 330. Applications 310 may include applications 312A through 312L. Usage history 320 may include launch counts 322, launch logs 323, and usage time 324. Application metadata 325 may include tags 326 and store categories 327. Application library 330 may include category 332B and category 332D. In one or more implementations, category 332B, category 332D, and/or one or more other categories may be stored in a category display order (e.g., with category 332B followed by category 332D in the example of FIG. 3) that indicates an order in which the categories are to be displayed in an application library user interface. Category 332B may include ordered list 334B, which references applications 312A, 312E, 312C, 312D, and 312F in an application display order with respective positions 1, 2, 3, 4, and 5. Category 332D may include ordered list 334D, which references applications 312A, 312K, 312I, 312I, 312H, and 312G in an application display order with respective positions 1, 2, 3, 4, 5, and 6. Memory 204 may include home screen manager 350, home screen layouts 351, and library updater 352.

As shown in FIG. 3, a number of applications 310 including applications 312A through 312L may be installed on electronic device 102. The applications 310 may, for example, have been previously downloaded from application store server 114. In some implementations, the applications 310 may also include applications downloaded from an enterprise application distribution server that is separate from application store server 114. For example, the enterprise application distribution server may only be accessible from a corporate intranet or other private network separate from network 112.

When a user launches and spends time interacting with one or more of the applications 310, the activity may be tracked and recorded by home screen manager 350 to update usage history 320. For example, launch counts 322 may track a total number of application launches and wakes for each of applications 310, launch logs 323 may track dates and times of each launch and wake, and usage time 324 may track total time spent in each of applications 310. In some implementations, one or more portions of usage history 320 may be derived from other data in usage history 320. For example, launch counts 322 and usage time 324 may be derived from launch logs 323, in which case home screen manager 350 may only update launch logs 323 so that launch counts 322 and usage time 324 may be derived from launch logs 323 as needed.

As illustrated in FIG. 3, in one or more implementations, storage 202 may be memory that stores installed applications 310 and an application library 330 including a set of categories (e.g., categories 332B and 332D) of the installed applications for display in an application library user interface, ordered according to a category display order. In the example of FIG. 3, each of categories 332B and 332D include a respective subset of the installed applications 310 that is ordered in an application display order (e.g., indicated by the respective ordered lists 334B and 334D) for display within that category in the application library user interface. In one or more implementations, processor 212 may be configured to generate an updated set of categories by modifying the categories included in the set of categories. As examples, the processor 212 may modify the categories included in the set of categories by dividing a first one of the categories into additional categories based on the usage history, removing one of categories from the application library, adding a new category to the application library, modifying the category display order of the categories, and/or modifying the application display order within one or more of the categories.

Home screen manager 350 may also maintain application metadata 325 for applications 310, which may include tags 326, store categories 327, and other classification metadata. The metadata may be retrieved from various private and public data sources, e.g. over network 112. For example, tags 326 may include tags visible to the user, such as user defined tags, usage time category names, and application type such as a public application available from application store server 114, an enterprise application for corporate use, an application that is part of a subscription service such as a gaming subscription, or a beta or test application. Tags 326 may also include non-visible tags, such as internal descriptive or categorization tags that are not exposed to users. Store categories 327 may include public category names, headings, and groupings of applications 310 available from application store server 114.

Home screen manager 350 may also maintain home screen layouts 351, which is shown in memory 204 but may also be stored in storage 202. Home screen layouts 351 may define the position of shortcuts to applications 310 on home screens, and may also define whether a home screen is hidden or visible. When a home screen is hidden, home screen manager 350 may not display the hidden home screen, but the applications 310 linked from the hidden home screens may still be accessible from application library 330.

For example, in one or more implementations, the home screen manager 350 may store, in the home screen layouts 351, home screen layout information for the each of one or more home screens. In one or more implementations, the home screen layout information may indicate whether any of multiple home screens for the electronic device are hidden from display. In one or more implementations, the library updater 352 may determine the application display order for at least one of the categories in part based on a link or association, in the home screen layout information, between an application of a respective subset of the installed applications for one of the categories and one of the home screens that is indicated to be hidden from display.

Library updater 352 may update application library 330 in a periodic manner or in response to certain system events, such as installation or removal of an application from applications 310. As described below in FIG. 4, categories may be determined for application library 330 by building a hierarchy based on usage history 320 and refining the hierarchy until a target number of categories are reached. Application library 330 may also include static categories that are always shown to the user, such as a recently-used applications category (e.g., "Recently Used Applications"), a recommended-applications category (e.g., "Recommended for You"), and/or an "Other" category for applications that may not merit a separate categorization. As shown in category 332B and 332D, a respective ordered list 334B and 334D are provided that reference one or more installed applications 310. The categories 332B and 332D, and/or the ordered lists 334B and 334D may be sorted in order of relevance to the user. For example, the references near the top of the lists may be determined to be of higher relevance to the user, for example by using a weighted relevance score based on one or more factors including usage history 320. For example, in the case of "Recently Used Applications," applications with a higher associated count in launch counts 322 may have a greater weighting, applications with a more recent launch time in launch logs 323 may have a greater weighting, and applications with a longer total usage time in usage time 324 may have a greater weighting. On the other hand, in the case of "Recommended for You", applications may be weighted in an opposite manner, providing higher weights to applications that have a sparse records in usage history 320 or applications that have shortcuts positioned towards later home screens or in hidden home screens according to home screen layouts 351, thereby encouraging discovery of unused or seldom used applications.

Figure 4:
FIG. 4 illustrates a block diagram of an example process for determining application categories of an application library by refining a hierarchy until a target number of leaf nodes is reached.
Figure 4:
Figure 4:
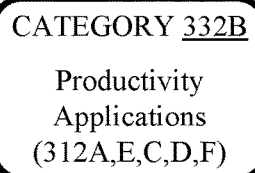
Figure 4:
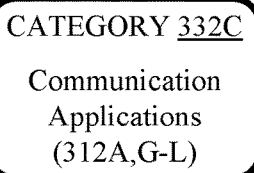
Figure 4:
Figure 4:
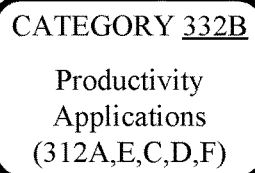
Figure 4:
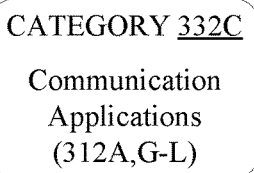
Figure 4:
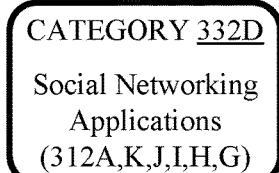
Figure 4:
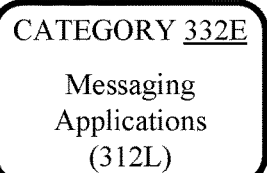

FIG. 4 illustrates a block diagram of an example process for determining application categories (e.g., an initial set of categories and/or a modified set of categories) of an application library by refining a hierarchy until a target number of leaf nodes is reached. For example, beginning with hierarchy 410A, a single root node may be provided, or category 332A corresponding to the category of "Installed Applications", or all applications 312A-312L in applications 310. A target number of leaf nodes may be 3 leaf nodes, corresponding to three categories, although any number of leaf nodes may be targeted. To determine the next refinement, leaf nodes may be analyzed for splitting into two or more branches based on usage history 320. In hierarchy 410A, only one leaf node is present, or category 332A. Thus, the usage history 320 for applications 312A-312L may be analyzed to determine branches for a hierarchy refinement.

As shown in hierarchy 410B, the refinement split the "Installed Applications" of category 332A into two branches, or category 332B for "Productivity Applications" and category 332C for "Communication Applications". For example, library updater 352 may examine usage history 320 to determine usage of applications 312A-312L, and/or refer to application metadata 325 to determine the type or classification of applications that are being used. In the example shown, usage history 320 and/or application metadata 325 may indicate an approximately equal split between use of "Productivity Applications" and "Communication Applications", resulting in categories 332B and 332C being selected for the branches of category 332A. In other examples, usage history 320 and/or application metadata 325 (e.g., an enterprise tag) may result in an "Enterprise Applications" category being generated (e.g., selected for a branch of category 332A or another category or generated as a standalone category). In other examples, usage history 320 and/or application metadata 325 may result in the formation of a "Productivity and Finance" category, a "Utilities" category, a "Creativity" category, an "Information and Reading" category, an "Entertainment" category, a "Shopping and Food" category, a "Health and Fitness" category, an "Education" category, a "Travel" category, and/or a "Games" category.

As shown in hierarchy 410C, a further refinement may split the "Communication Applications" of category 332C into two further branches of category 332D for "Social Networking Applications" and category 332E for "Messaging Applications". As with the refinement from hierarchy 410A to 410B, the refinement from hierarchy 410B to 410C may be based on library updater 352 analyzing both usage history 320 and application metadata 325. Since hierarchy 410C now provides the target 3 leaf nodes, refinement of the hierarchy may end.

In this fashion, the categories or leaf nodes that are selected are based at least on usage history 320, which may generally function as a good predictor of application categories that the user may be interested in. For example, if the usage history 320 and application metadata 325 instead indicated that a majority of time was previously spent in gaming applications, then the hierarchy 410C may instead develop into a hierarchy of gaming genres and gaming related categories while omitting categories that have a sparse usage history.

Figure 5A:
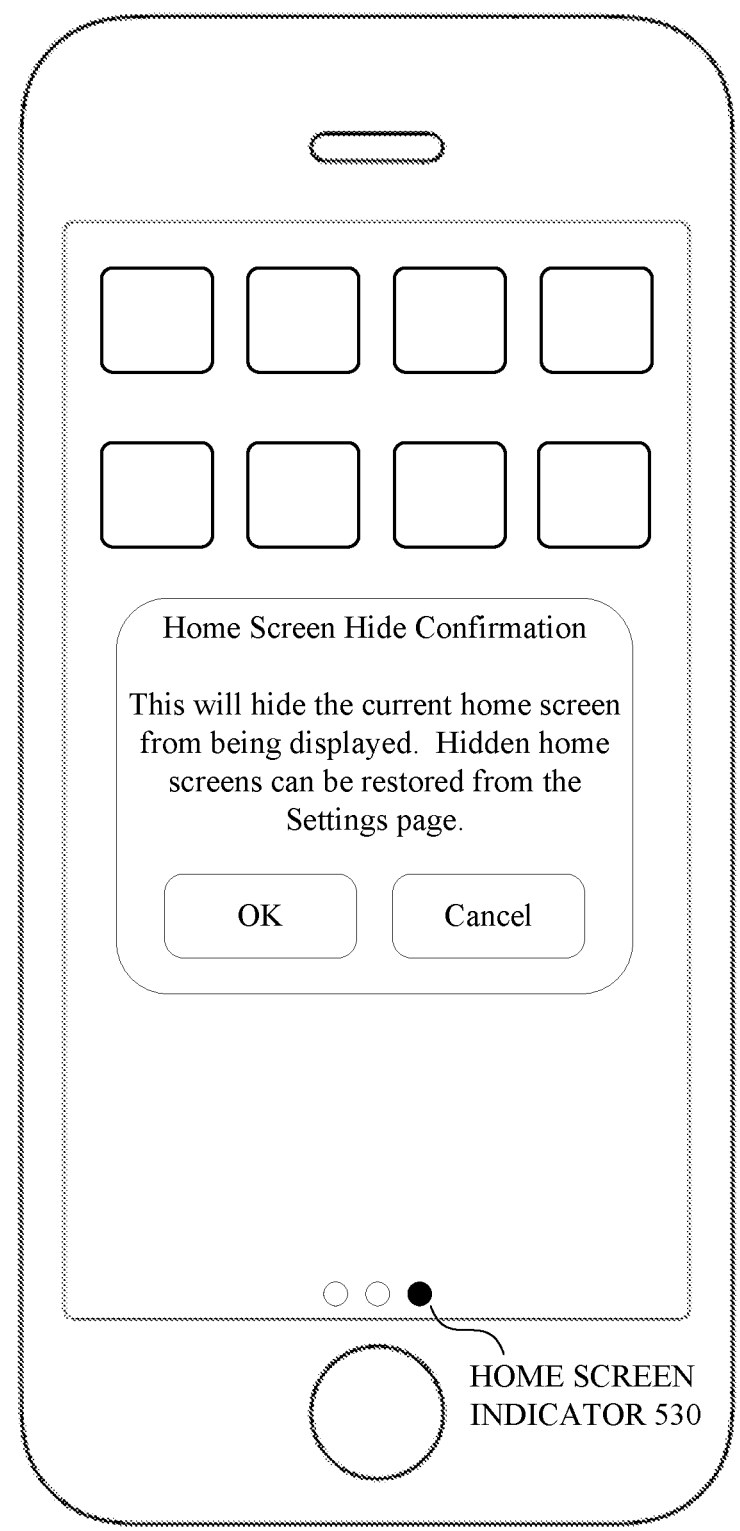
FIG. 5A illustrates an example user interface for hiding a home screen, in accordance with one or more implementations.

FIG. 5A illustrates an example user interface for hiding a home screen, in accordance with one or more implementations. For example, the user may provide a user input, such as a long touch, that reveals a user interface element that allows the current home screen to be hidden. As shown in FIG. 5A, the user may be prompted to confirm hiding the current home screen. As shown by home screen indicator 530, the current home screen is the third home screen.

Figure 5B:
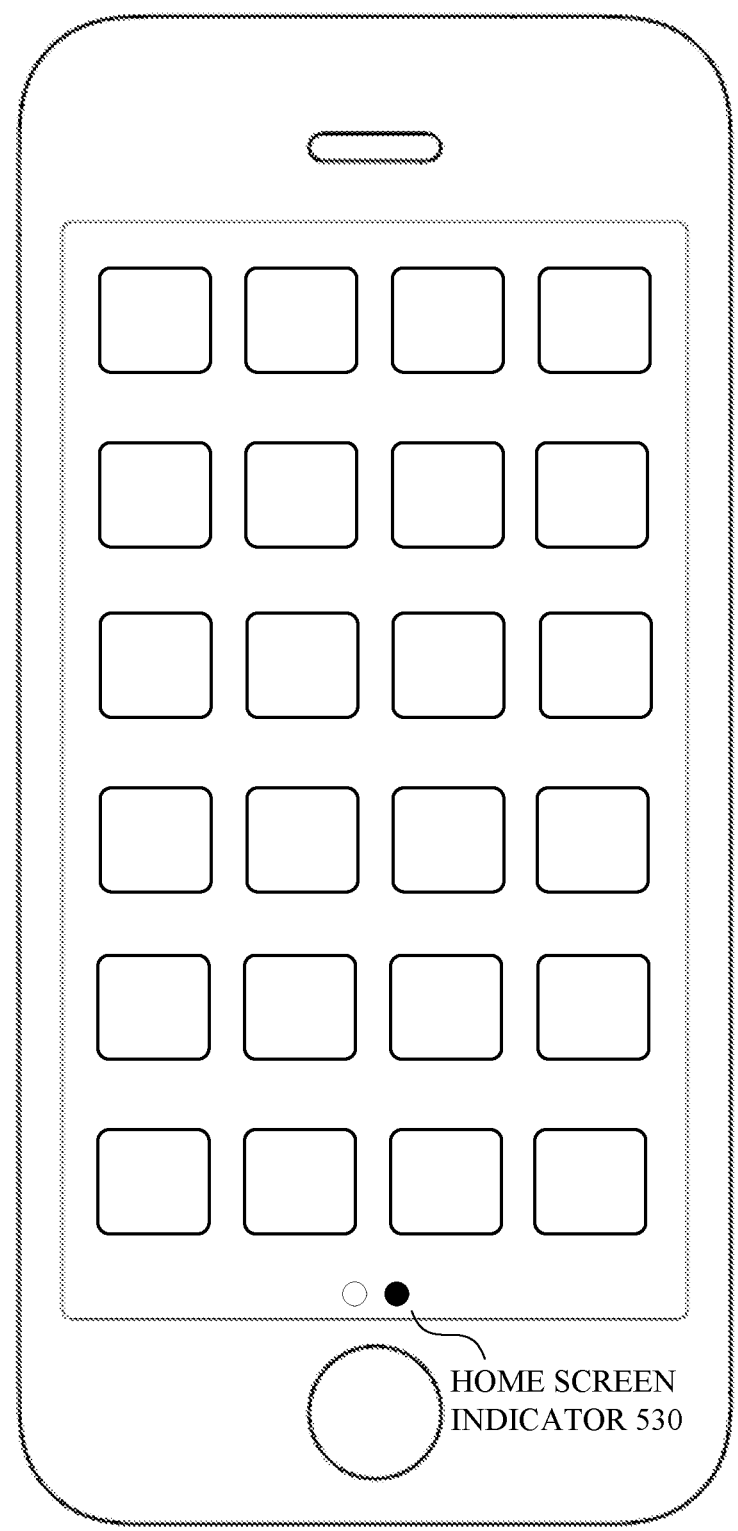
FIG. 5B illustrates an example user interface after hiding a home screen, in accordance with one or more implementations.

FIG. 5B illustrates an example user interface after hiding a home screen, in accordance with one or more implementations. Thus, after the user confirms the prompt shown in FIG. 5A, the third home screen may be hidden, which may be reflected in home screen layouts 351. The current home screen may automatically transition to the closest available home screen, or the second home screen as indicated by the updated home screen indicator 530.

Figure 6:
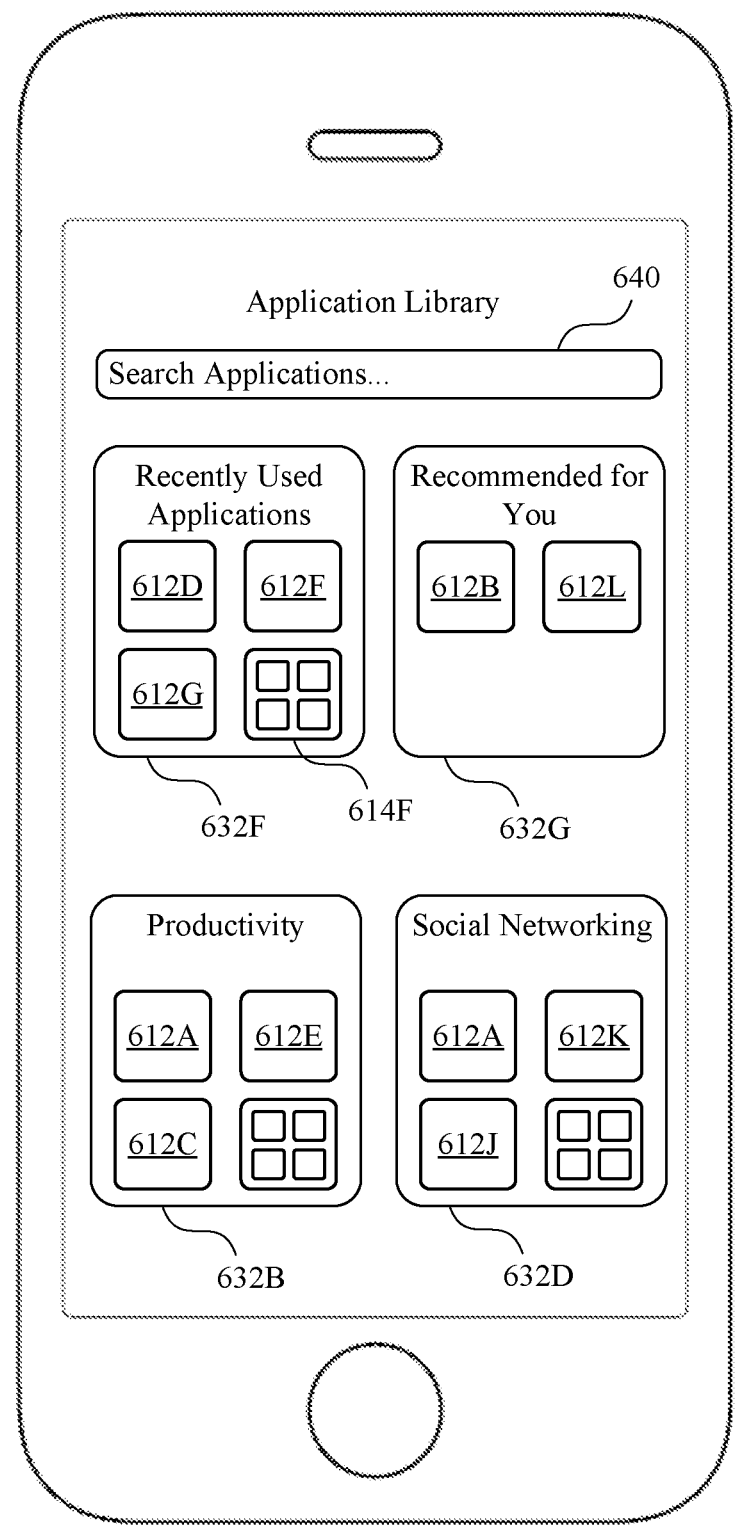
FIG. 6 illustrates an example user interface for launch interfaces of an application library, in accordance with one or more implementations.

FIG. 6 illustrates an example user interface for launch interfaces 632B, 632D, 632F, and 632G of application library 330, in accordance with one or more implementations. For example, referring back to FIGS. 5A and 5B, by swiping right past the final or rightmost home screen as indicated by home screen indicator 530, a user interface as shown in FIG. 6 may appear. A search bar 640 may also be provided that may limit search results to applications 310 instead of searching data sources generally.

As discussed above, a number of static or fixed categories may be included by default, such as "Recently Used Applications" shown by launch interface 632F and "Recommended for You" shown by launch interface 632G. Categories that are based on usage history such as "Productivity" and "Social Networking" are also shown by respective launch interfaces 632B and 632D. The launch interfaces 632B, 632D, 632F and 632G may also be referred to herein as pods or "category pods," that each include one or more shortcuts 612A-L for launching corresponding applications 312A-L. While not specifically shown in FIG. 6, launch interfaces may also be shown for category 332E or "Messaging Applications", and a static category "Other" for applications that do not fit into an existing category.

Referring to launch interface 632F, three direct launch shortcuts, or shortcuts 612D, 612F, and 612G are shown, which may launch respective applications 312D, 312F, and 312G when interacted by the user, such as by touch input, pen input, mouse input, or another user input. The remaining launch shortcuts may be grouped together into folder 614F, which may be interacted by the user to display a corresponding folder launch interface. While three direct launch shortcuts and one folder are provided, any configuration of shortcuts is possible.

As shown in, for example launch interface 632B, the ordering of the shortcuts displayed in each category pod corresponds to the associated ordered list 334B. Thus, the applications with the highest relevance weighting may be shown towards the top, and the less relevant applications may be grouped together in the folder. Further, if the associated ordered list does not include enough applications to fill the corresponding launch interface, then at least the available applications may be shown, as shown in e.g. launch interface 632G.

Note that, in one or more implementations, applications may also be assigned to multiple categories. For example, shortcut 612A is present in both launch interface 632B and 632D, where shortcut 612A may launch the same application 312A that may, for example, correspond to a social networking application for professional networking. In this case, application 312A may be categorized under both "Productivity" and "Social Networking". In another example, an application that is categorized under "Productivity" or "Social Networking" may also be categorized under "Recently Used Applications" or "Recommended for You". In another example, an enterprise application from an enterprise may be categorized into an "Enterprise" category associated with the enterprise and into the "Recently Used Applications" category, and a shortcut to the same enterprise application may be provided in the category pods for both the "Recently Used Applications" category and the "Enterprise" category. In one or more implementations, applications may be prevented from being categorized into more than one category in addition to the "Recently Used Applications" and the "Recommended for You" categories.

Although the example of FIG. 6 illustrates category pods for a "Recently Used Applications" category, a "Recommended for You" category, a "Productivity" category, and a "Social Networking" category, it should be appreciated that category pods can be provided in the application library for other categories such as an "Enterprise Applications" category, a "Finance" category, a "Utilities" category, a "Creativity" category, an "Information and Reading" category, an "Entertainment" category, a "Shopping and Food" category, a "Health and Fitness" category, an "Education" category, a "Travel" category, a "Games" category, and/or other suitable categories.

Further, as discussed above, certain categories may be updated at different independent update intervals. For example, it may be desirable to maintain the ordering of the "Recently Used Applications" in launch interface 632F for a minimum period of time, such as at least one week, to facilitate muscle memory when launching frequently used applications. A corresponding category may thus be updated on a weekly schedule. On the other hand, in order to frequently rotate new applications for application discovery, the ordering of "Recommended for You" in launch interface 632G may be updated on a more frequent schedule, such as daily. A corresponding category may thus be updated on a daily schedule.

In some cases, the user may prefer that certain categories do not display in the application library. Accordingly, options may be provided to the user to prevent certain categories or particular applications from being selected for display in the application library user interfaces. These options may be respected for both the static categories and the dynamically generated categories based on application usage.

In some implementations, it may be useful to allow the user to add a category pod directly to a home screen. When a category pod is added to a home screen that is already full of shortcuts, such as in FIG. 5B, some shortcuts may be displaced to an overflow home screen that is automatically created to receive the displaced shortcuts. In this manner, the specific organization and layout of existing home screens is not modified due to the displacement. When space is made available again on the home screen, such as by removing the category pod or deleting/moving shortcuts, the displaced shortcuts from the overflow home screen may be moved back to their original positions and the overflow home screen may be automatically deleted. A similar process may also be supported for adding other user interfaces that displace items on a home screen, such as adding a widget to a home screen.

Figure 7:
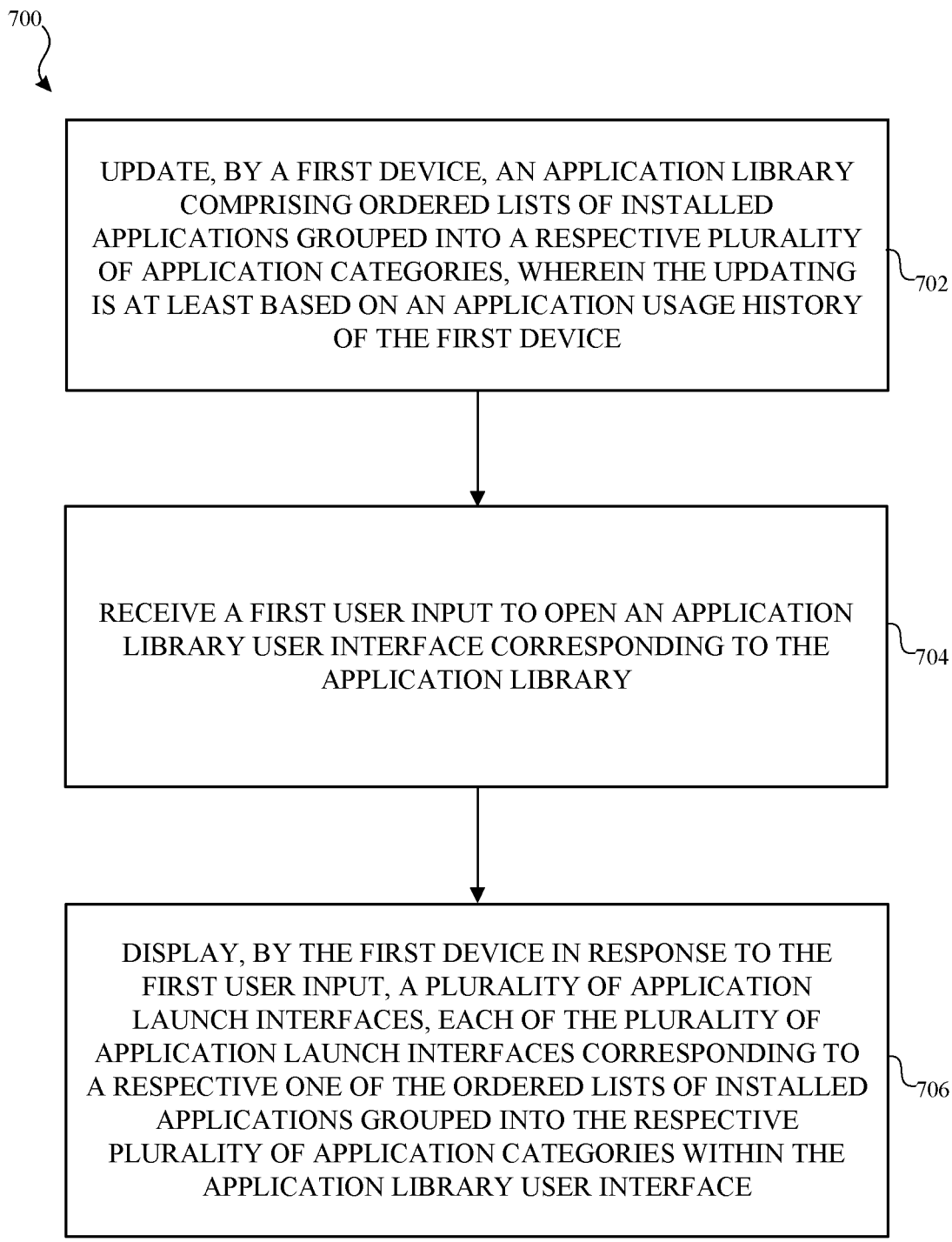
FIG. 7 illustrates an example flow diagram for a process providing an application library for application discovery, in accordance with one or more implementations.

FIG. 7 illustrates a flow diagram of an example process 700 including blocks 702, 704, and 706 for providing an application library for application discovery, in accordance with one or more implementations. For explanatory purposes, the process 700 is primarily described herein with reference to the electronic devices 102, 104, 106, 108 and 110 of FIG. 1. However, the process 700 is not limited to the electronic devices 102, 104, 106, 108 and 110, and one or more blocks (or operations) of the process 700 may be performed by one or more other components and/or other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The electronic device 102 updates an application library including ordered lists of installed applications grouped into a respective plurality of application categories, where the updating is at least based on an application usage history of the electronic device 102 (702). Referring to FIG. 3, this may correspond to library updater 352 updating application library 330 including ordered lists 334B and 334D of applications 310, where the updating is at least based on usage history 320, which may be maintained by home screen manager 350. As discussed above, the categories selected for application library 330 may be determined in part by refining a hierarchy, as described in FIG. 4. Updating the application library may include updating one or more of the ordered lists 334B and/or 334D of existing categories (e.g., by updating the applications listed in the "Recently Used Applications" category based on the usage history 320 and/or by updating the order in which applications are provided in the ordered lists) and/or creating one or more new categories and associated ordered lists.

The electronic device 102 receives a first user input to open an application library user interface corresponding to the application library (704). Referring to FIGS. 5A and 5B, this may correspond to electronic device 102 receiving a swipe right gesture while home screen indicator 530 indicates the current home screen is the last or rightmost home screen.

The electronic device 102 displays, in response to the first user input, a plurality of application launch interfaces, each of the plurality of application launch interfaces corresponding to a respective one of the ordered lists of installed applications grouped into the respective plurality of application categories within the application library user interface (706). Referring to FIG. 6, this may correspond to electronic device 102 displaying, in response to the swipe right gesture, launch interfaces 632B and 632D corresponding to respective ordered lists 334B and 334D, and launch interfaces 632F, and 632G corresponding to respective ordered lists (not specifically shown).

Figure 8:
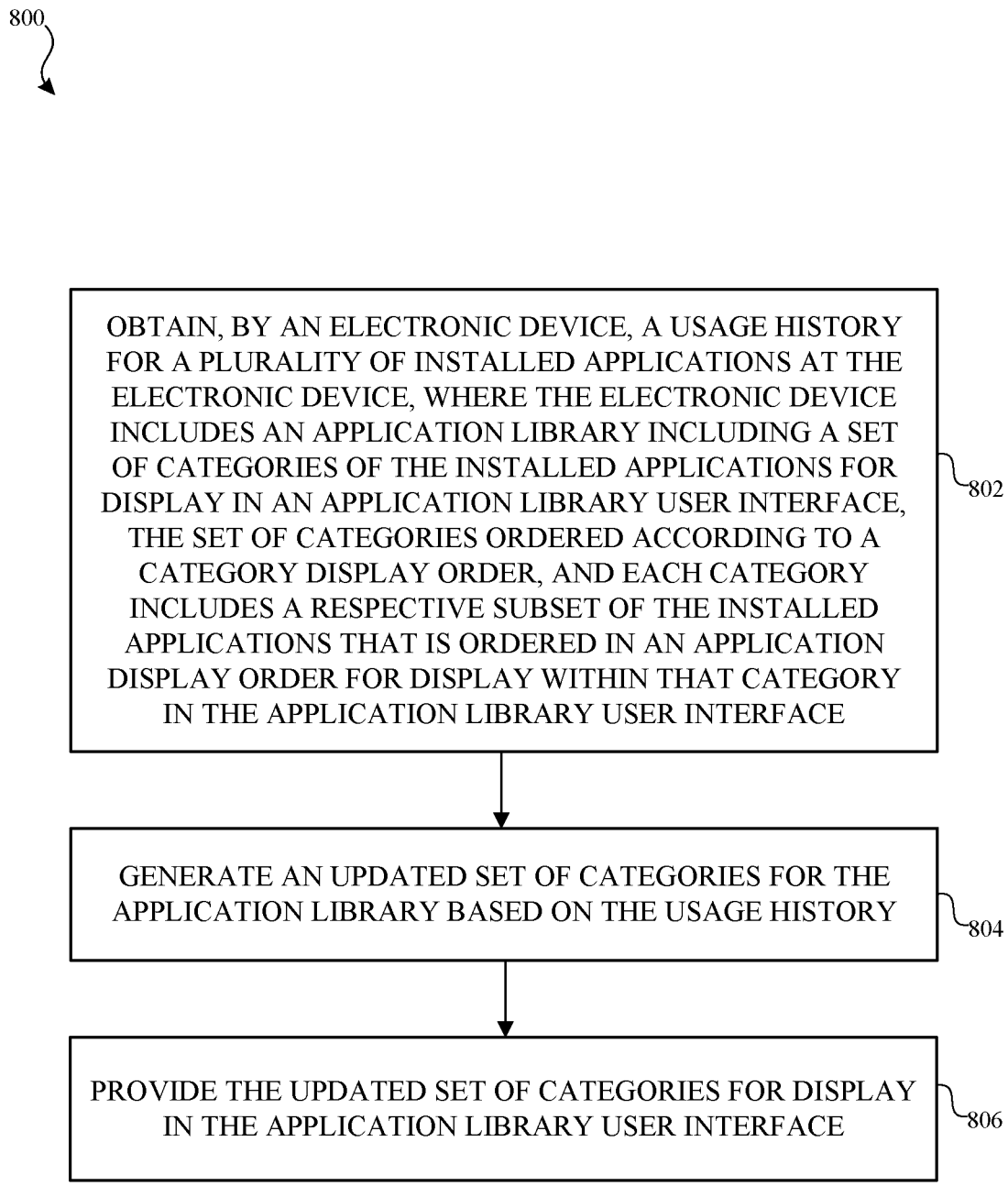
FIG. 8 illustrates an example flow diagram for a process of operating an electronic device having an application library, in accordance with one or more implementations.

FIG. 8 illustrates a flow diagram of an example process 800 for operating an electronic device, in accordance with one or more implementations. For explanatory purposes, the process 800 is primarily described herein with reference to the electronic devices 102, 104, 106, 108 and 110 of FIG. 1. However, the process 800 is not limited to the electronic devices 102, 104, 106, 108 and 110, and one or more blocks (or operations) of the process 800 may be performed by one or more other components and/or other suitable devices. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

At block 802, an electronic device (e.g., electronic device 102) obtains a usage history (e.g., usage history 320) for a plurality of installed applications (e.g., installed applications 310) at the electronic device. The electronic device may include an application library (e.g., application library 330) including a set of categories (e.g., categories 332B, 332D, etc.) of the installed applications for display in an application library user interface (e.g., an application library user interface as shown in the example of FIG. 6). The set of categories may be ordered according to a category display order, and each category may include a respective subset of the installed applications that is ordered in an application display order for display within that category in the application library user interface. For example, returning to the discussion of FIG. 6 and reading left to right and top to bottom, a set of categories is displayed in the following category display order: Recently Used Applications, Recommended for You, Productivity, and Social Networking. In this example, the application display order for the Recently Used Applications category is: the application corresponding to the shortcut 612D, the application corresponding to the shortcut 612F, the application corresponding to the shortcut 612G, and the applications in the folder 614F.

At block 804, the electronic device (e.g., library updater 352) may generate an updated set of categories for the application library based on the usage history. In various operational scenarios, generating the updated set of categories may include one or more of: modifying the category display order, modifying the application display order, modifying the categories included in the set of categories, or the modifying the respective subset of the installed applications for at least one category. For example, generating the updated set of categories may include modifying the categories included in the set of categories by dividing a first one of the categories into multiple additional categories based on the usage history (e.g., by dividing the Productivity category into multiple subcategories if the usage history indicates a large number, such as more than four, of productivity-related applications being frequently used by the user, and/or by dividing the Social Networking category into multiple subcategories if the usage history indicates a large number, such as more than four, of social-media-related applications being frequently used by the user).

Figure 9:
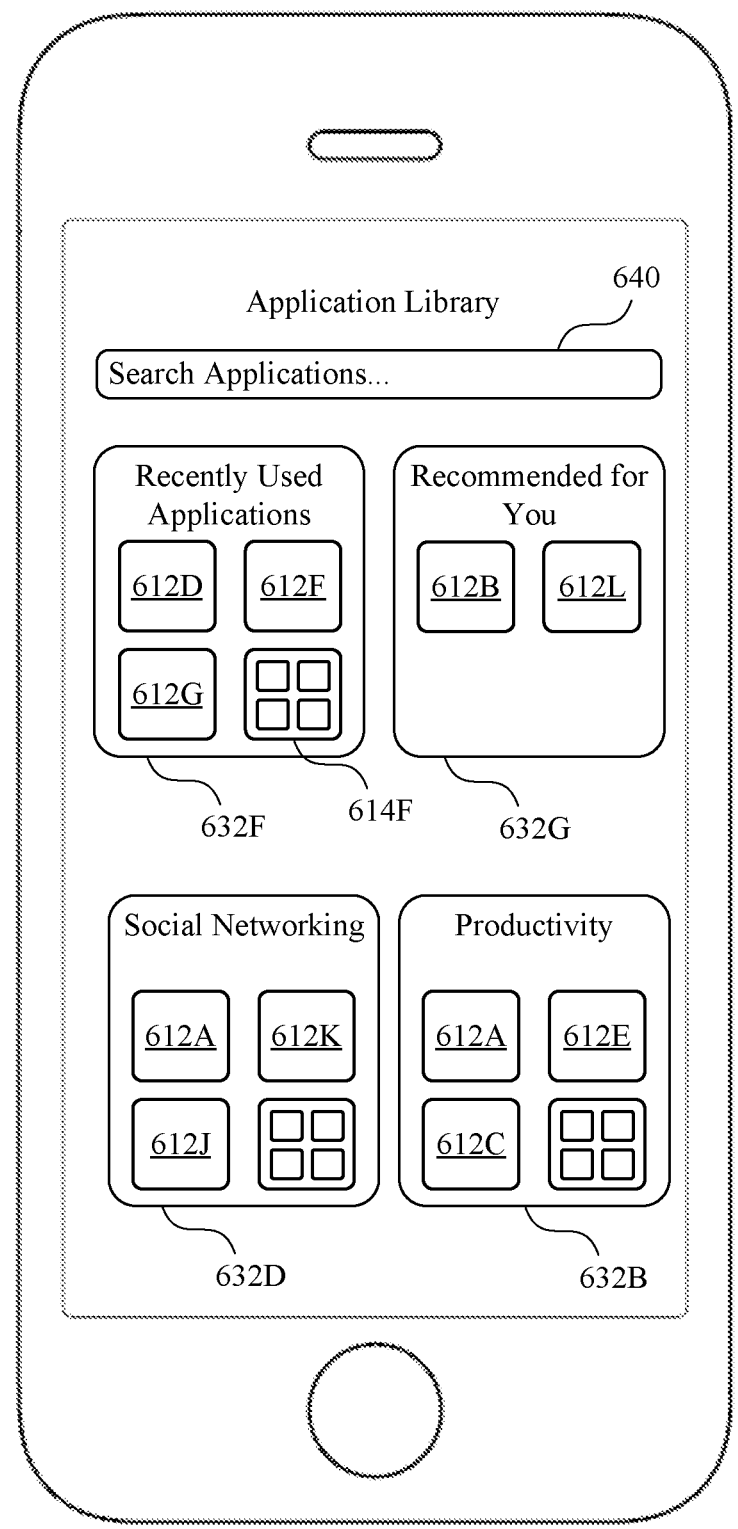
FIG. 9 illustrates an example modified application library user interface in which categories and their corresponding launch interfaces have been modified according to a modified category display order, in accordance with one or more implementations.
Figure 10:
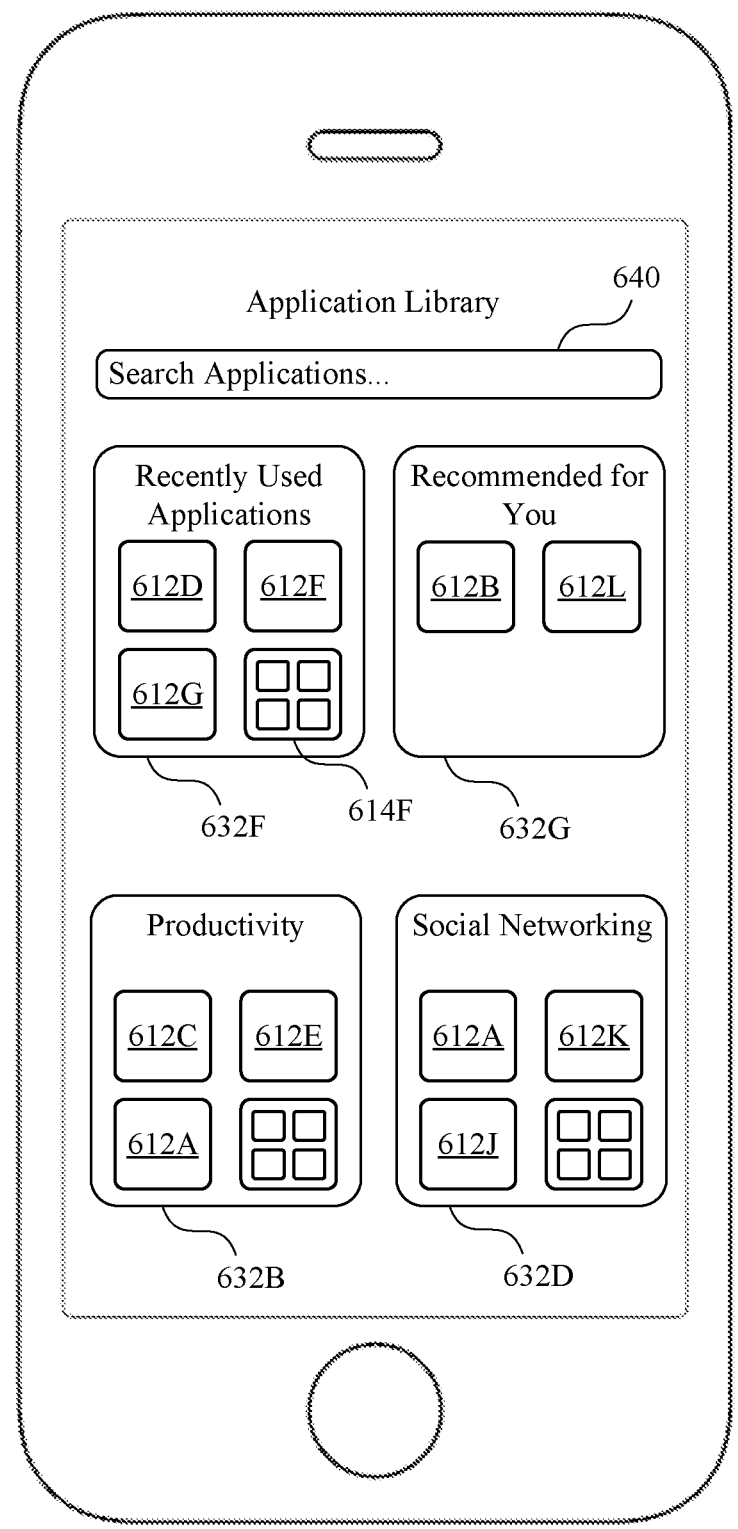
FIG. 10 illustrates an example modified application library user interface in which applications and their corresponding shortcuts in a category have been modified according to a modified application display order, in accordance with one or more implementations.

As another example, generating the updated set of categories may include modifying the category display order based on the usage history. For example, in an operational scenario in which the applications in the Social Networking category are indicated, by the usage history, as being used more often and/or more frequently than the applications in the Productivity category, the Social Networking category and the Productivity category may be swapped in the category display order, as illustrated in FIG. 9. As another example, generating the updated set of categories may include modifying the application display order for at least one of the categories based on the usage history. For example, modifying the application display order for at least one of the categories may include moving the application corresponding to the shortcut 612C in front of the application corresponding to the shortcut 612A in the Productivity category, as illustrated in FIG. 10, if the usage history indicates that the application corresponding to the shortcut 612C is being used more frequently than the application corresponding to the shortcut 612A. For example, modifying the application display order for the at least one of the categories may include modifying the application display order for the at least one of the categories, and maintaining the application display order for another of the at least one of the categories (e.g., by moving the application corresponding to the shortcut 612C in front of the application corresponding to the shortcut 612A in the Productivity category without moving the applications corresponding to the shortcuts 612A, 612K, and 612K in the Social Network category, as illustrated in FIG. 10).

Figure 11:
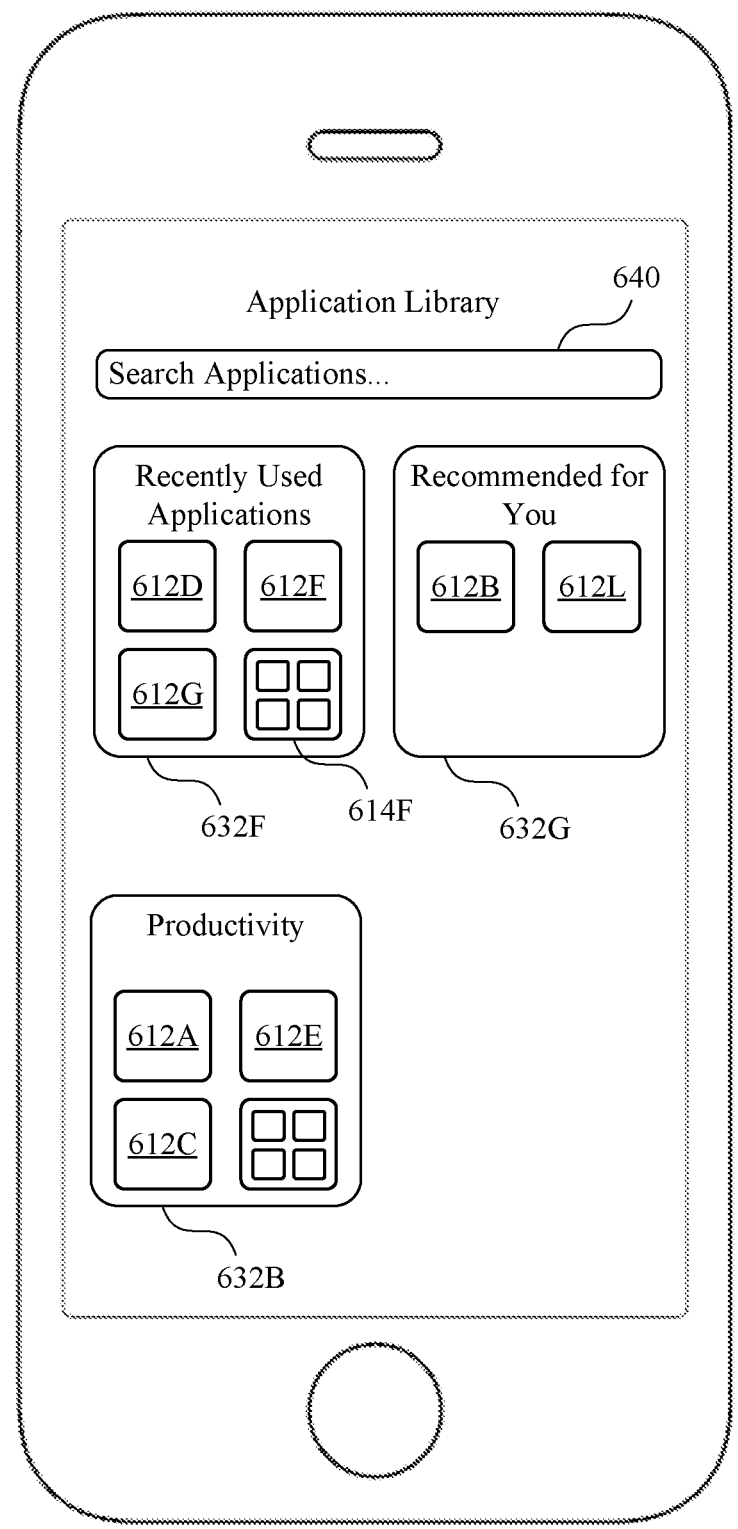
FIG. 11 illustrates an example modified application library user interface in which a category has been removed from the application library, in accordance with one or more implementations.

As another example, generating the updated set of categories may include modifying the categories included in the set of categories by removing one of categories from the application library. For example, in a scenario in which the usage history indicates that user of the electronic device has not recently used any of the applications in the Social Networking category, the Social Networking category may be removed from the application library, as illustrated in FIG. 11.

In one or more implementations, generating the updated set of categories may include generating an updated set of categories based on the usage history and based on application classification metadata. The application classification metadata may include, for at least one of the plurality of installed applications, at least one of: a visible tag, a non-visible tag, a store category, an application type, and an indicator of inclusion in a subscription At block 806, the updated set of categories may be provided for display in the application library user interface. The application library user interface may then be displayed (e.g., when the user navigates to the application library user interface, such as by swiping past a last home screen, as described herein).

In one or more implementations, the set of categories is an initial set of categories, and the electronic device may also generate the initial set of categories. Generating the initial set of categories may include generating a first category that includes a first plurality of the installed applications, and dividing the first category into multiple additional categories, based on a prior usage history of the first plurality of the installed applications, until a target number of categories has been generated (e.g., as described above in connection with FIG. 4).

In one or more implementations, the set of categories in the application library includes a recently-used applications category and a recommended-applications category. The electronic device may update the respective subset of the installed applications for the recently-used applications category according to a first update schedule and update the respective subset of the installed applications for the recommended-applications category according to a second update schedule. For example, updating the respective subset of the installed applications for the recently-used applications category may include waiting at least a minimum period of time between updates to the respective subset of the installed applications for the recently-used applications category. Updating the respective subset of the installed applications for the recommended-applications category may include updating the respective subset of the installed applications for the recommended-applications category more frequently than the minimum period of time between the updates to the respective subset of the installed applications for the recently-used applications category.

In one or more implementations, the electronic device may also determine the application display order for each of the categories. Determining the application display order for each of the categories may include determining a first application display order for a first one of the categories based on a most recent launch time for the respective subset of the installed applications for the first one of the categories. Determining the application display order for each of the categories may also include determining a second application display order for a second one of the categories based on a usage time for the respective subset of the installed applications for the second one of the categories.

In one or more implementations, the electronic device may also store, by a home screen manager such as home screen manager 350, home screen layout information that indicates whether any of multiple home screens for the electronic device are hidden from display. The electronic device may also determine the application display order for at least one of the categories based on a link or association, in the home screen layout information, between an application of the respective subset of the installed applications for the at least one of the categories and one of the home screens that is indicated to be hidden from display. For example, the electronic device may move an application that is associated with a hidden home screen higher in the application display order in one or more categories (e.g., in order to recommend an application that may not otherwise be visible to the user in a current operating mode of the electronic device).

In one or more implementations, the home screen manager of the electronic device may also receive a request to move an application launch interface corresponding to one of categories from the application library user interface to one of the multiple home screens for the electronic device that are not hidden from display. The home screen manager may also determine, based on stored home screen layout information for the one of the multiple home screens, a lack of space for the one of the application launch interfaces in the one of the multiple home screens. The home screen manager may also identify an application shortcut currently associated with the one of the multiple home screens in the home screen layout information. The home screen manager may also generate an overflow home screen, and update the home screen layout information to associate the one of the application launch interfaces with the one of the multiple home screens and to associate the application shortcut with the overflow home screen.

In one or more implementations, the home screen manager may also determine that space has become available in the one of the multiple home screens. The home screen manager may also update the home screen layout information to associate the application shortcut with the one of the multiple home screens and to remove the overflow home screen from the home screen layout information.

The subject technology provides for methods and systems for providing an application library for application discovery and page hiding for home screen management. A user interface for navigating an application library is provided, where the application library includes ordered lists of applications grouped into categories that may be of interest to a user. The lists of applications may be shown in pods such as category pods, in which a fixed number of best matches in a category are shown, and the remaining matches may be viewed within a folder. Categories in the application library may be updated periodically or in response to particular events, such as installing or removing an application. Categories may be determined based on application usage history and a number of other factors such as storefront categories, visible or hidden tags, and application type. To determine the specific categories, applications in the application usage history may be organized into a hierarchy and refined until a threshold number of nodes or categories are provided. Application ordering within individual categories may be updated according to independent schedules, and select categories may also be hidden from display. Home screens may also be made visible or non-visible to assist in home screen management, allowing the user to hide home screens that are rarely used while maintaining access to hidden applications. In this manner, application discovery may be facilitated, thereby providing improved device performance by enabling applications to be launched more quickly.

According to various implementations, a method for providing an application library for application discovery is provided. The method may include updating, by a first device, an application library including ordered lists of installed applications grouped into a respective plurality of application categories. In one or more implementations, the updating is at least based on an application usage history of the first device. The method may include receiving a first user input to open an application library user interface corresponding to the application library. The method may include displaying, by the first device in response to the first user input, a plurality of application launch interfaces, each of the plurality of application launch interfaces corresponding to a respective one of the ordered lists of installed applications grouped into the respective plurality of application categories within the application library user interface.

According to various other implementations, a method is provided that includes obtaining, by an electronic device, a usage history for a plurality of installed applications at the electronic device. The electronic device includes an application library including a set of categories of the installed applications for display in an application library user interface. The set of categories is ordered according to a category display order, and each category includes a respective subset of the installed applications that is ordered in an application display order for display within that category in the application library user interface. The method also includes generating an updated set of categories for the application library based on the usage history. Generating the updated set of categories includes one or more of: modifying the category display order, modifying the application display order, modifying the categories included in the set of categories, or the modifying the respective subset of the installed applications for at least one category. The method also includes providing the updated set of categories for display in the application library user interface.

According to various other implementations, a method is provided that includes providing, by an electronic device, an application library including a set of categories of installed applications at the device for display in an application library user interface ordered according to a category display order, each category comprising a respective subset of the installed applications that is ordered in an application display order for display within that category in the application library user interface; and storing, by a home screen manager of the electronic device, home screen layout information that indicates whether any of multiple home screens for the electronic device are hidden from display.

Other aspects include corresponding systems, apparatuses, and computer program products for implementation of the computer-implemented method.

As described above, one aspect of the present technology is the gathering and use of data available from specific and legitimate sources for displaying an application library. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for recognizing a spoken command. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of outputting media content, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 12:
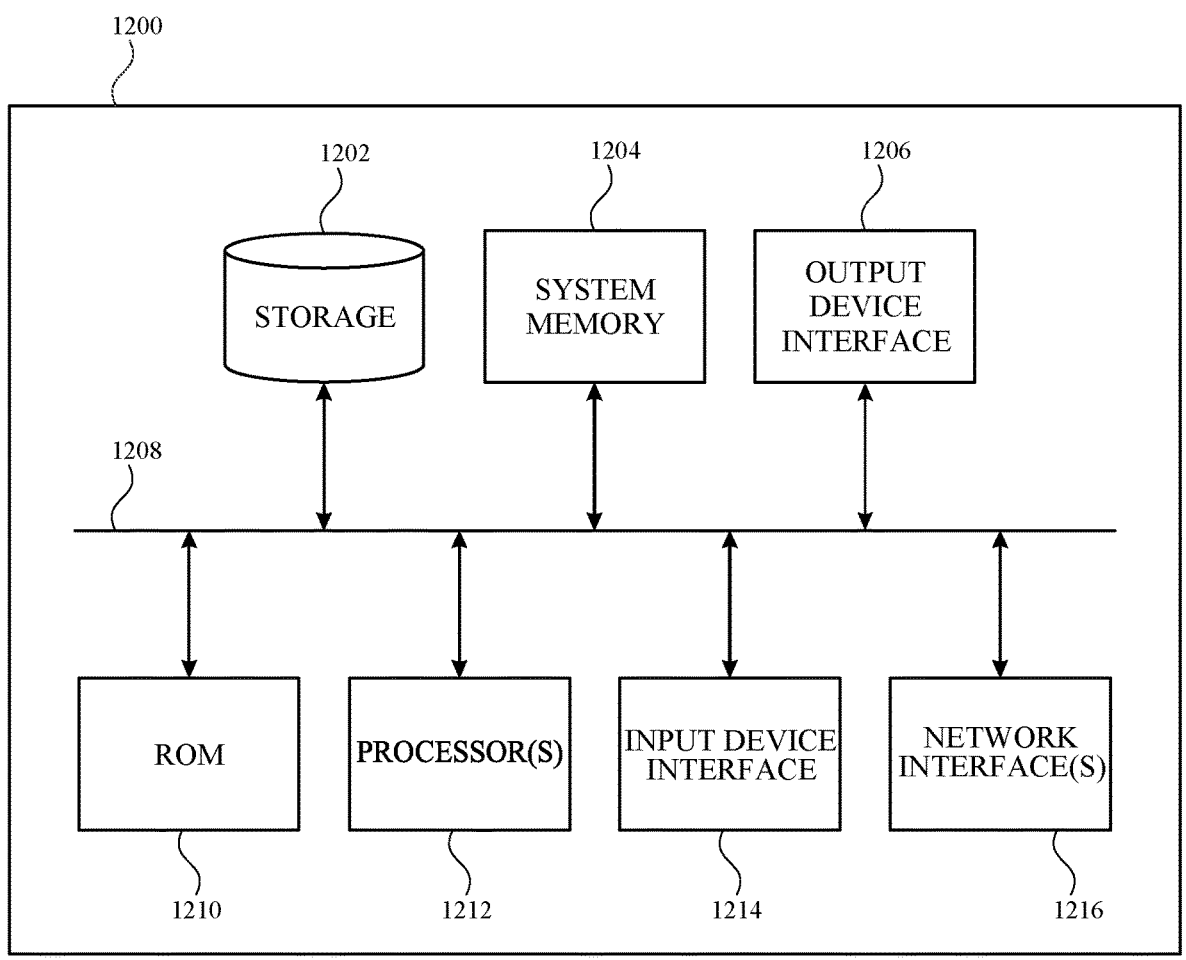
FIG. 12 illustrates an example electronic system with which aspects of the subject technology may be implemented in accordance with one or more implementations.

FIG. 12 illustrates an electronic system 1200 with which one or more implementations of the subject technology may be implemented. The electronic system 1200 can be, and/or can be a part of, one or more of the electronic devices 102-110, and/or one or the servers 114-118 shown in FIG. 1. The electronic system 1200 may include various types of computer readable media and interfaces for various other types of computer readable media. The electronic system 1200 includes a bus 1208, one or more processing unit(s) 1212, a system memory 1204 (and/or buffer), a ROM 1210, a permanent storage device 1202, an input device interface 1214, an output device interface 1206, and one or more network interfaces 1216, or subsets and variations thereof.

The bus 1208 collectively represents all system, peripheral, and chipset buses that communicatively connect the numerous internal devices of the electronic system 1200. In one or more implementations, the bus 1208 communicatively connects the one or more processing unit(s) 1212 with the ROM 1210, the system memory 1204, and the permanent storage device 1202. From these various memory units, the one or more processing unit(s) 1212 retrieves instructions to execute and data to process in order to execute the processes of the subject disclosure. The one or more processing unit(s) 1212 can be a single processor or a multi-core processor in different implementations.

The ROM 1210 stores static data and instructions that are needed by the one or more processing unit(s) 1212 and other modules of the electronic system 1200. The permanent storage device 1202, on the other hand, may be a read-and-write memory device. The permanent storage device 1202 may be a non-volatile memory unit that stores instructions and data even when the electronic system 1200 is off. In one or more implementations, a mass-storage device (such as a magnetic or optical disk and its corresponding disk drive) may be used as the permanent storage device 1202.

In one or more implementations, a removable storage device (such as a floppy disk, flash drive, and its corresponding disk drive) may be used as the permanent storage device 1202. Like the permanent storage device 1202, the system memory 1204 may be a read-and-write memory device. However, unlike the permanent storage device 1202, the system memory 1204 may be a volatile read-and-write memory, such as random access memory. The system memory 1204 may store any of the instructions and data that one or more processing unit(s) 1212 may need at runtime. In one or more implementations, the processes of the subject disclosure are stored in the system memory 1204, the permanent storage device 1202, and/or the ROM 1210. From these various memory units, the one or more processing unit(s) 1212 retrieves instructions to execute and data to process in order to execute the processes of one or more implementations.

The bus 1208 also connects to the input and output device interfaces 1214 and 1206. The input device interface 1214 enables a user to communicate information and select commands to the electronic system 1200. Input devices that may be used with the input device interface 1214 may include, for example, alphanumeric keyboards and pointing devices (also called "cursor control devices"). The output device interface 1206 may enable, for example, the display of images generated by electronic system 1200. Output devices that may be used with the output device interface 1206 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 12, the bus 1208 also couples the electronic system 1200 to one or more networks and/or to one or more network nodes, such as one or more of the servers 114-118 shown in FIG. 1, through the one or more network interface(s) 1216. In this manner, the electronic system 1200 can be a part of a network of computers (such as a LAN, a wide area network ("WAN"), or an Intranet, or a network of networks, such as the Internet. Any or all components of the electronic system 1200 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    obtaining, by an electronic device, a usage history for a plurality of installed applications at the electronic device, wherein the electronic device comprises an application library including a set of categories of the installed applications for display in an application library user interface, the set of categories ordered according to a category display order, and each category comprising a respective subset of the installed applications that is ordered in an application display order for display within that category in the application library user interface, wherein the set of categories comprises a recently-used applications category and a recommended-applications category;
    generating an updated set of categories for the application library based on the usage history, wherein generating the updated set of categories includes modifying the categories included in the set of categories based on the usage history;
    providing the updated set of categories for display in the application library user interface; and
    updating the respective subset of the installed applications for the recently-used applications category according to a first update schedule and the respective subset of the installed applications for the recommended-applications category according to a second update schedule.

2. The method of claim 1, wherein generating the updated set of categories comprises modifying the categories included in the set of categories by dividing a first one of the categories into a plurality of additional categories based on the usage history.

3. The method of claim 1, wherein generating the updated set of categories comprises modifying the category display order based on the usage history.

4. The method of claim 1, wherein generating the updated set of categories comprises modifying the application display order for at least one of the categories based on the usage history.

5. The method of claim 4, wherein modifying the application display order for the at least one of the categories comprises: modifying the application display order for the at least one of the categories, and maintaining the application display order for another of the at least one of the categories.

6. The method of claim 1, wherein generating the updated set of categories comprises modifying the categories included in the set of categories by removing one of categories from the application library.

7. The method of claim 1, wherein the set of categories is an initial set of categories, and wherein the method further comprises generating the initial set of categories by:
generating a first category comprising a first plurality of the installed applications; and
dividing the first category into a plurality of additional categories, based on a prior usage history of the first plurality of the installed applications until a target number of categories has been generated.

8. The method of claim 1, wherein updating the respective subset of the installed applications for the recently-used applications category comprises waiting at least a minimum period of time between updates to the respective subset of the installed applications for the recently-used applications category.

9. The method of claim 8, wherein updating the respective subset of the installed applications for the recommended-applications category comprises updating the respective subset of the installed applications for the recommended-applications category more frequently than the minimum period of time between the updates to the respective subset of the installed applications for the recently-used applications category.

10. The method of claim 1, further comprising determining the application display order for each of the categories by:
determining a first application display order for a first one of the categories based on a most recent launch time for the respective subset of the installed applications for the first one of the categories; and
determining a second application display order for a second one of the categories based on a usage time for the respective subset of the installed applications for the second one of the categories.

11. The method of claim 1, wherein generating the updated set of categories comprises generating an updated set of categories based on the usage history and based on application classification metadata, wherein the application classification metadata includes, for at least one of the plurality of installed applications, at least one of: a visible tag, a non-visible tag, a store category, an application type, and an indicator of inclusion in a subscription.

12. The method of claim 1, wherein the usage history includes, for each of several of the plurality of installed applications, at least one of: a launch count, a launch log, or a usage time.

13. The method of claim 1, further comprising:
storing, by a home screen manager of the electronic device, home screen layout information that indicates whether any of multiple home screens for the electronic device are hidden from display.

14. The method of claim 13, further comprising determining the application display order for at least one of the categories based on a link, in the home screen layout information, between an application of the respective subset of the installed applications for the at least one of the categories and one of the home screens that is indicated to be hidden from display.

15. The method of claim 13, further comprising:
receiving, by the home screen manager of the electronic device, a request to move an application launch interface corresponding to one of categories from the application library user interface to one of the multiple home screens for the electronic device that are not hidden from display;
determining, by the home screen manager and based on stored home screen layout information for the one of the multiple home screens, a lack of space for the one of the application launch interfaces in the one of the multiple home screens;
identifying, by the home screen manager, an application shortcut currently associated with the one of the multiple home screens in the home screen layout information;
generating, by the home screen manager, an overflow home screen; and
updating the home screen layout information to associate the one of the application launch interfaces with the one of the multiple home screens and to associate the application shortcut with the overflow home screen.

16. The method of claim 15, further comprising:
determining, by the home screen manager, that space has become available in the one of the multiple home screens; and
updating the home screen layout information to associate the application shortcut with the one of the multiple home screens and to remove the overflow home screen from the home screen layout information.

17. A device, comprising:
a memory storing a plurality of installed applications and an application library including a set of categories of the installed applications for display in an application library user interface ordered according to a category display order, each category comprising a respective subset of the installed applications that is ordered in an application display order for display within that category in the application library user interface, wherein the set of categories comprises a recently-used applications category and a recommended-applications category; and
at least one processor configured to:
obtain a usage history for the plurality of installed applications;
generate an updated set of categories for the application library based on the usage history by performing one or more of: modifying the category display order, modifying the application display order, modifying the categories included in the set of categories, or the modifying the respective subset of the installed applications for at least one category;
provide the updated set of categories for display in the application library user interface; and
update the respective subset of the installed applications for the recently-used applications category according to a first update schedule and the respective subset of the installed applications for the recommended-applications category according to a second update schedule.

18. The device of claim 17, wherein the at least one processor is configured to generate the updated set of categories by modifying the categories included in the set of categories by performing at least one of:
dividing a first one of the categories into plurality of additional categories based on the usage history; and
removing one of categories from the application library.

19. A non-transitory computer-readable medium, storing instructions which, when executed by at least one processor cause the at least one processor to perform operations including:
obtaining a usage history for a plurality of installed applications at an electronic device, wherein the electronic device comprises an application library including a set of categories of the plurality of installed applications for display in an application library user interface, the set of categories ordered according to a category display order, and each category comprising a respective subset of the plurality of the installed applications that is ordered in an application display order for display within that category in the application library user interface;

generating an updated set of categories for the application library based on the usage history, wherein generating the updated set of categories includes one or more of: modifying the category display order, modifying the application display order, modifying the categories included in the set of categories, or the modifying the respective subset of the plurality of the installed applications for at least one category, the generating comprising:

determining the application display order for at least one of the categories based at least in part on a link between an application of the respective subset of the installed applications for the at least one of the categories and one of a plurality of home screens that is indicated to be hidden from display; and providing the updated set of categories for display in the application library user interface.

20. The non-transitory computer-readable medium of claim 19, wherein the set of categories is an initial set of categories, and wherein the instructions, when executed by the at least one processor cause the at least one processor to generate the initial set of categories by:

generating a first category comprising a first plurality of the installed applications; and dividing the first category into a plurality of additional categories, based on a prior usage history of the first plurality of the installed applications until a target number of categories has been generated.

21. The non-transitory computer-readable medium of claim 19, wherein generating the updated set of categories comprises modifying the categories included in the set of categories by removing one of categories from the application library.

* * * * *